United States Patent [19]
Herfurth

[11] Patent Number: 5,982,642
[45] Date of Patent: Nov. 9, 1999

[54] PULSED POWER SUPPLY OF SWITCHED-MODE POWER SUPPLIES

[75] Inventor: Michael Herfurth, Gilching, Germany

[73] Assignee: Siemens Aktiengesellschaft, Munich, Germany

[21] Appl. No.: 09/287,806

[22] Filed: Apr. 7, 1999

Related U.S. Application Data

[63] Continuation of application No. PCT/DE97/02130, Sep. 19, 1997.

[30] Foreign Application Priority Data

Oct. 7, 1996 [DE] Germany .......................... 196 41 299

[51] Int. Cl.$^6$ .................................................. H02M 3/335
[52] U.S. Cl. ................................ 363/21; 363/65; 323/222
[58] Field of Search .................................. 363/21, 41, 65; 323/222

[56] References Cited

U.S. PATENT DOCUMENTS 5,267,133  11/1993  Motomura et al. ..................... 363/21

*Primary Examiner*—Shawn Riley
*Attorney, Agent, or Firm*—Herbert L. Lerner; Laurence A. Greenberg

[57] ABSTRACT

A pulsed power supply of switched-mode power supplies, in particular for switched-mode power supplies with stand-by operation, has a main converter for the electrical isolation of primary and secondary circuits, as well as for transforming the voltages of the primary and secondary circuits. The pulsed power supply further has a pulsed second converter and a first closed-loop control circuit for an intermediate circuit voltage. The first closed-loop control circuit being assigned to the second converter and has a first output circuit connected on a downstream side of the second converter. A second closed-loop control circuit is provided for the intermediate circuit voltage. The second closed-loop control circuit is assigned to the second converter and is superimposed on the first closed-loop control circuit such that it can be activated at least temporarily or completely replaces the first closed-loop control circuit at least temporarily. The control time constant of the first closed-loop control circuit being greater than the control time constant of the second closed-loop control circuit.

9 Claims, 3 Drawing Sheets

PULSED POWER SUPPLY OF SWITCHED-MODE POWER SUPPLIES

CROSS-REFERENCE TO RELATED APPLICATION

This is a continuation of copending International Application PCT/DE97/02130, filed Sep. 19, 1997, which designated the United States.

A BACKGROUND OF THE INVENTION

FIELD OF THE INVENTION

The invention relates to a pulsed power supply of switched-mode power supplies, in particular of switched-mode power supplies with stand-by operation. The power supply has the following features:

a) a main converter for electrically isolating the primary and secondary circuits, as well as for transforming the voltages of the primary and secondary circuits b) a pulsed second converter, c) a first closed-loop control circuit for an intermediate circuit voltage, the first closed-loop control circuit being assigned to the second converter, and d) a first output circuit connected downstream of the second converter.

Modern electronic equipment such as, for example, PC units, fax units or TV sets usually currently have a stand-by function. In the case of a TV set in the stand-by state, the set is "switched off" and can be switched again to rated duty, for example via a remote control. In the case of a fax unit, the unit is ready to receive and is switched on, for example, by an incoming fax signal. The different equipment states of stand-by operation or equipment operation therefore frequently have separate requirements for the power supply of the switched-mode power supply. The power consumption is intended to be as low as possible in the stand-by operation. In particular, in this case the aim is to supply only such equipment functions as are necessary for a quick readiness for use and which are required for detecting a start signal such as, for example, the infrared signal of a remote control or the receiving signal of a fax modem.

Having regard to as high an efficiency as possible for the operating states of the device, it is customary at present to implement the power supply by a main power supply for the nominal/maximum load and an additional auxiliary power supply for the minimum load, such as is necessary, for example, in the standby operation of a PC unit.

In addition to the known PWM converter (Pulse Width Modulation; DC/DC converter) for the main power supply of the device, the main power supplies will frequently contain a further, so-called PFC converter because of technical/economic considerations and in order to meet existing national and international standards and regulations. The PFC converter (Power Factor Correction; AC/DC converter) serves the prescribed improvement of the power factor, while the classical PWM converter undertakes the transformation and supply isolation. The power factor is defined as the ratio between absorbed real power and absorbed apparent power. The power factor is ideally equal to one. There is no reactive power in this case. For reasons of cost and because of their high efficiency, PFC converters are typically configured as step-up converters. Alternatively, the PFC converter can also, for example, be configured as a flyback converter.

It would be advantageous, with the switched off device or PWM converter section, to use the PFC converter as the power supply for the standby operation, and thus to economize on a separate auxiliary power supply. In practice, the use of the PFC converter, which appears trivial at first glance, has failed owing to the fact that because of its principle, a closed-loop control circuit must be configured to be dynamically slow for the output voltage of the PFC converter, in order to keep the modulations of the absorbed line current slight by the control. In numerous operational states, such as, for example, when running up the power supply or in the case of load steps, this leads to lengthy pauses in the pulsed operation, the result being that the flow of energy from the auxiliary power supply is interrupted. Bridging of the clock-pulse spaces, for example by larger storage capacitors, fails because the operating time is insufficient for recharging in specific operating states.

A power supply, of the generic type, of the switched-mode power supply is specified, for example, in "Power-Factor-Controller verbessert Leistungsfaktor von Schaltnetzteilen" ["Power Factor of Switched-Mode Power Supplies is Improved by the Power Factor Controller TDA 4815/19"] by Werner Schott, in the brochure entitled *Siemens Components* 31 (1993), Issue 2, pages 46 to 50. Specified here, in particular in FIG. 2, is a switched-mode power supply having an active harmonic filter, configured as a step-up converter (PFC converter) and a forward converter (PWM converter). Further integrated circuits of the generic type are described, for example, in the data sheets for the module TK 84 819 from the Toko company, for the module LT 1509 from the Linear Technology company and for the module ML 4824 from the Micro Linear company.

SUMMARY OF THE INVENTION

It is accordingly an object of the invention to provide a pulsed power supply of switched-mode power supplies that overcomes the above-mentioned disadvantages of the prior art devices of this general type, in which it is possible to dispense with a separate auxiliary power supply, in particular for standby operation.

With the foregoing and other objects in view there is provided, in accordance with the invention, a pulsed power supply of a switched-mode power supply, including a switched-mode power supply with a stand-by operation, containing: a) a main converter for electrically isolating primary and secondary circuits and for transforming voltages of the primary and secondary circuits; b) a pulsed converter having a first output circuit and an output voltage, the pulsed converter connected upstream of the main converter; c) a first closed-loop control circuit for an intermediate circuit voltage equal to the output voltage of the pulsed converter and having a first control time constant, the first closed-loop control circuit associated with the pulsed converter; and d) a second closed-loop control circuit associated with the pulsed converter and having a second output circuit for the intermediate circuit voltage and a second control time constant, the second closed-loop control circuit being superimposed on the first closed-loop control circuit such that it can be activated at least temporarily for replacing the first closed-loop control circuit at least temporarily, the first control time constant of the first closed-loop control circuit greater than the second control time constant of the second closed-loop control circuit.

Here, the second closed-loop control circuit for the intermediate circuit voltage is provided, which is assigned to the second converter and which is superimposed on the first closed-loop control circuit such that it can be activated at least temporarily or completely replaces the first closed-loop control circuit at least temporarily. The control time constant of the first closed-loop control circuit being greater than the control time constant of the second closed-loop control circuit.

An essential constituent of the invention is the introduction of a second closed-loop control circuit for the intermediate voltage. The second closed-loop control circuit is superimposed on the power converter. The power converter is advantageously a converter with power factor correction (PFC converter). The power converter is configured as an active harmonic filter, which permits sinusoidal power consumption and broadband transformation. The second closed-loop control circuit controls dynamically very much quicker than the first closed-loop control circuit of the PFC converter, which is dynamically slow in principle. The power converter can be activated if required and be partially superimposed on the first power supply, or completely replace it. In the standby operation, the power supply is performed by the power converter itself without the use of a separate auxiliary power supply.

In one embodiment, the power converter is typically configured as a step-up converter. Alternatively, it is also conceivable to replace the converter section by another power converter such as, for example, a flyback converter, a step-up/step-down converter or the like. However, because of their higher efficiency or for reasons of cost, step-up converters are to be preferred as power converters.

In one development, a further output circuit with a short delay time is connected in parallel in the output circuit of a PFC converter. The energy flow can be detected more quickly thereby.

In one embodiment, a further winding voltage is tapped in each case at the inductor via at least one further winding.

Each of the winding voltages is respectively fed to a rectifier circuit. A separate output voltage is present in each case at the respective outputs of the rectifier circuits.

In an advantageous development, the rectifier circuit can be configured as a bridge rectifier or as a charging pump.

In one embodiment, at least one output voltage of the rectifier circuits is used as the supply voltage on the primary side. The primary-side supply voltage can, for example, drive the system control of the integrated circuit. A further output voltage can be used as supply voltage on the secondary side. The supply voltages can be provided, for example, for the secondary-side power supply of equipment functions, in particular for stand-by operation.

By using the configuration according to the invention, it is advantageously possible even in the case of complete unloading of the PFC converter to maintain at its main outputs the pulsed operation for supplying further consumers such as, for example, the stand-by equipment function or the system control, without the voltage rising impermissibly at the main output, or the clock-pulse spaces becoming too large.

Other features which are considered as characteristic for the invention are set forth in the appended claims.

Although the invention is illustrated and described herein as embodied in a pulsed power supply of switched-mode power supplies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
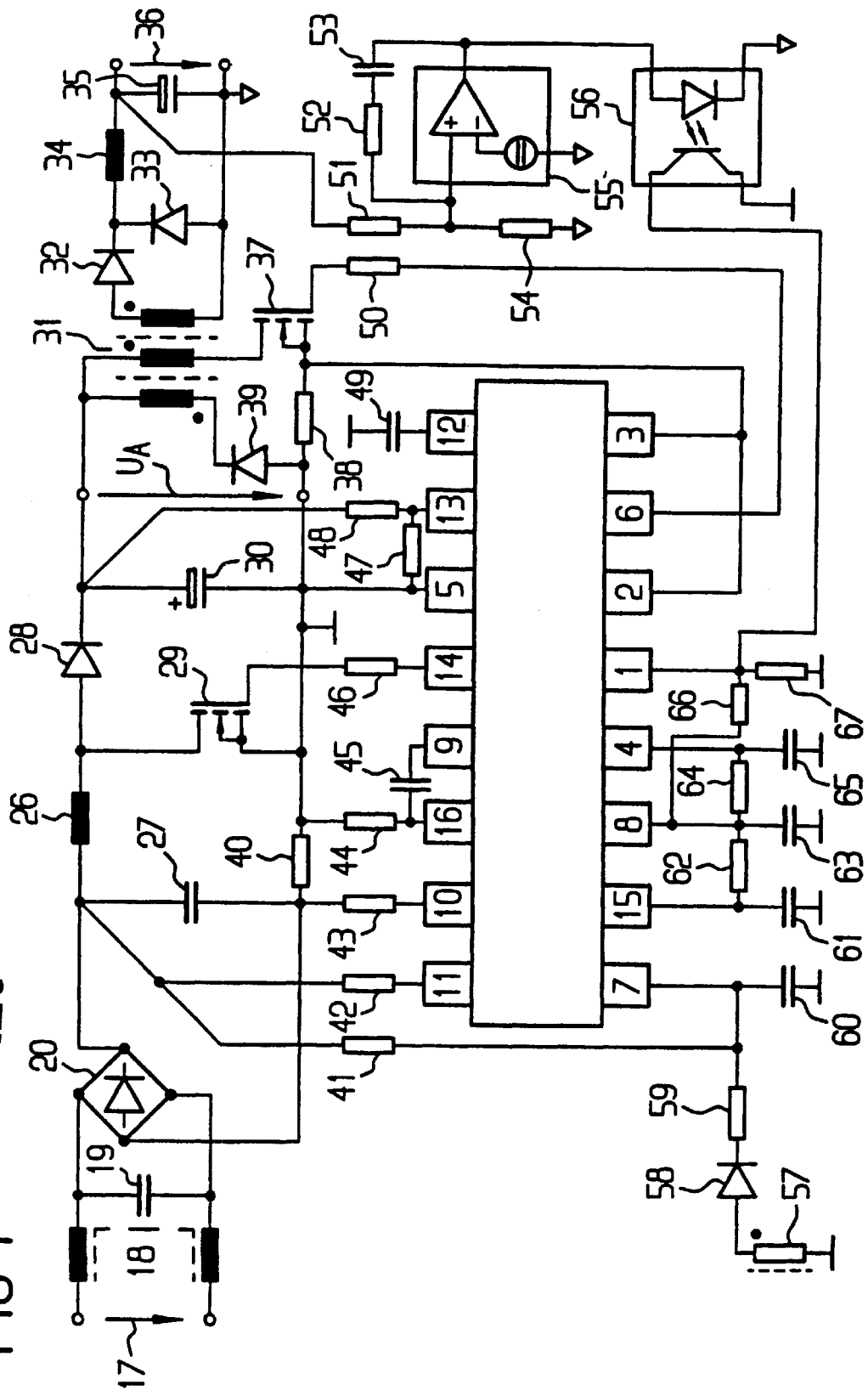
FIG. 1 is a diagrammatic block circuit diagram of a known power supply unit with an integrated control circuit for current control.

In all the figures of the drawing, sub-features and integral parts that correspond to one another bear the same reference symbol in each case. Referring now to the figures of the drawing in detail and first, particularly, to FIG. 1 thereof, there is shown a block diagram of a known pulsed power supply for a switched-mode power supply with a power factor correction (PFC) power converter.

The switched-mode power supply with the PFC converter in accordance with FIG. 1 is configured in a known way and has an input 17 with a downstream inductor 18, capacitor 19 and rectifier 20. A positive pole of the rectifier 20 is connected in series with a transformer 31 via an inductor 26 and a diode 28. A negative pole of the rectifier 20 is connected in series with a winding of the transformer 31 via a resistor 40 and a diode 39, and with a second winding of the transformer 31 via a resistor 38 and a MOSFET 37. Connected between the positive and negative output of the rectifier 20 is a capacitor 27, and a second MOSFET 29 is connected downstream of the inductor 26 in parallel with a reference potential of the circuit. A further capacitor 30, at which an intermediate circuit voltage UA is present, is connected between nodal points of a series circuit, composed of the diode 28 and the transformer 31, and earth reference.

An output circuit of the switched-mode power supply includes two diodes 32 and 33 and a downstream coil 34 and a capacitor 35, which are interconnected in a known way. The output voltage of the switched-mode power supply can be tapped at terminals 36.

An integrated control circuit IC has connections 1 to 16 which, via the lines represented in FIG. 1, are connected to the switched-mode power supply via respective resistors 41 to 44, 46 to 48, 50 as well as components 45, 49 and 57 to 67.

Elements 51 to 56 form a feedback branch with an optocoupler 56. The elements 57–59 form an auxiliary power supply for the integrated circuit IC. The winding 57 can be fitted, for example, on the transformer 31 or on the inductor 26. The auxiliary power supply is coupled into the integrated circuit IC at a terminal 7. In the configuration, a capacitor 60 is recharged, and in the case when a limiting voltage, which is typically at 50 V, is exceeded the capacitor 60 is discharged and supplies the integrated circuit IC.

The circuit in accordance with FIG. 1 is configured as a current control. The circuit according to FIG. 1 can also be used to perform voltage control by different interconnections of the terminals 1 and 3.

The terminals of the control circuit of the integrated circuit IC can be assigned as follows. The PWM control voltage, which is normally provided via the optocoupler 56, can be applied to the terminal 1. The terminal 2 serves the purpose of PWM current limitation. The terminal 3 is the PWM current sensor input, which in the current mode normally has an input range of 0 to 1.5 V, and in the voltage mode typically a range of 0 to 6 V. An external capacitor is connected to an oscillator at terminal 4. Terminal 5 is the earth terminal. Terminal 6 is the output of the PWM device driver. Terminal 7 is the connection for the supply voltage. An internal reference voltage, which is fed to the terminals 1, 4, 15 via the resistors 62, 64, 66, can be tapped at terminal 8. The terminal 9 is an output for compensation of the PFC current. The terminals 10 and 11 are connected to the output of a multiplier. Connection 10 is additionally also connected to the non-inverting input of an error amplifier. The terminal 12 is the output for a PVC current loop error amplifier for the voltage compensation, and is also connected to the safety comparator for missing load. The terminal 13 is an inverting input of a BUS voltage error amplifier, which contains a PFC over-voltage comparator and PWM over-voltage comparators. The gate terminal of a PFC driver transistor can be connected to terminal 14. A ramp voltage for forming the pulse duty factor for the PFC converter section is produced at terminal 15 upon interconnection with a capacitor to earth and a resistor downstream of terminal 8. The terminal 16 forms the inverting input of the PFC error current amplifier for compensation.

Figure 2:
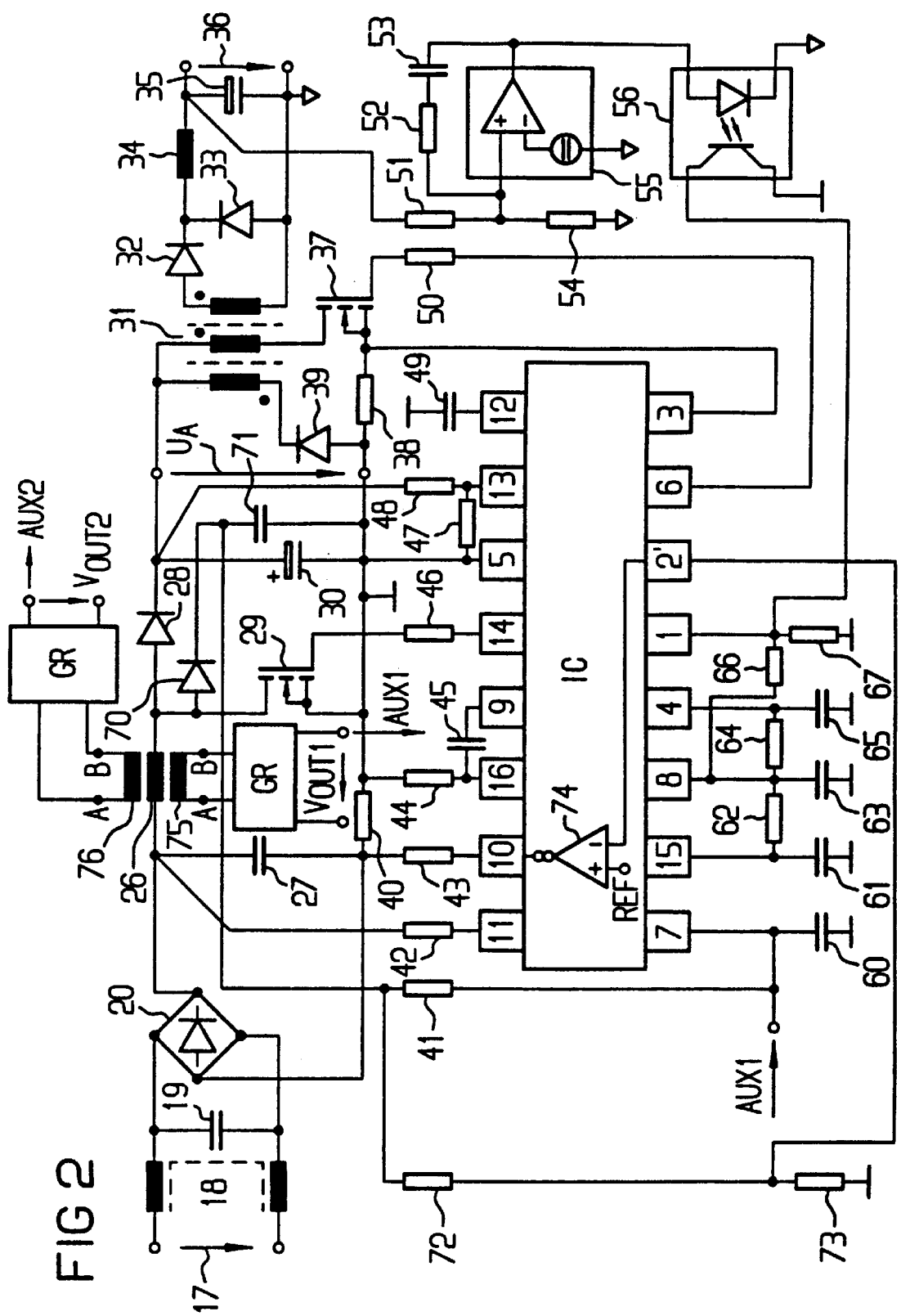
FIG. 2 is a block circuit diagram of the current control unit with an integrated control circuit which additionally has a second dynamically quick closed-loop control circuit as well as a second output circuit for an intermediate voltage according to the invention.

FIG. 2 shows a block diagram of the pulsed power supply, according to the invention, of the switched-mode power supply, which additionally has a second dynamic quick closed-loop control circuit and a second output circuit.

The pulsed power supply of the switched-mode power supply in FIG. 2 contains essentially the elements of the switched-mode power supply of FIG. 1. The power converter is formed here by the PFC converter section. The PFC converter in FIG. 2 is formed by a step-up converter. In the example of FIG. 2, the step-up converter includes the inductor 26, the diode 28 as well as the capacitors 27 and 30 and the MOSFET 29. The capacitor 30 is typically constructed as an electrolytic capacitor of relatively large capacitance. It would also be conceivable to form the PFC converter section by another power converter such as, for example, a flyback converter, a step-up/step-down converter or the like. However, the step-up converter is to be preferred as power converter for reasons of cost and/or because of its high efficiency.

Connected in parallel with the first output circuit for the intermediate circuit voltage containing the diode 28 and the capacitor 30 is a second output circuit containing a diode 70, a capacitor 71 and the resistor 41. The capacitance 71 is much lower than the capacitance of the electrolytic capacitor 30. Typical values are 100 μF for the capacitor 30, and 100 nF for the capacitor 71. For this reason, the delay time of the second output circuit with the above numerical values is some factors shorter than the delay time of the first output circuit. The resistor 41 has a relatively large resistance value of typically approximately 200 K, and serves principally for current limitation.

The pulsed PFC converter connected upstream of the main converter, which is formed as the transformer 31, contains a first closed-loop control circuit for the intermediate voltage. The first closed-loop control circuit, which provides a control signal at the terminal 12 of the integrated circuit IC, is configured to be dynamically slow in principle. According to the invention, a further (second) closed-loop control circuit is superimposed on the PFC converter. The second closed-loop control circuit has a rapid reaction time in dynamic terms. The second closed-loop control circuit is formed in this case by the output circuit that has the shorter delay. A signal is tapped at the base point of the voltage divider containing the resistance elements 72, 73, and fed to terminal 2" of the integrated circuit IC. The terminal 2" is thus distinguished from terminal 2 of FIG. 1. In the integrated circuit IC, the signal from the terminal 2" is fed to the inverting input of an OTA 74 (Operational Transconductance Amplifier).

The positive input of the OTA 74 is connected to a reference voltage REF. The OTA 74 drives the terminal 10 on the output side. A second dynamically quick control signal can then be tapped at the terminal 10.

The control time constants of the first and second closed-loop control circuits are essentially determined by the capacitors 30, 71 and 49. Typical values for the control time constants are 100 msec for the first closed-loop control circuit and 1 msec for the second, quick closed-loop control circuit.

The inductor 26 of the PFC converter in FIG. 2 has a further winding 75. The two ends of the winding 75 are connected to the terminals A, B, at which the winding voltage drops. The winding voltage dropping at the terminals A, B is fed to a rectifier circuit GR. A first separate supply voltage VOUT1 and a current signal AUX1 are provided on the output side on the rectifier circuit GR. The current signal AUX1 is fed into the terminal 7 and serves the purpose of auxiliary power supply on the primary side, in particular for the integrated circuit IC. This eliminates the elements of the auxiliary power supply 57–59 of FIG. 1.

In addition, the inductor 26 of the PFC converter in FIG. 2 has a third winding 76. The two ends of the winding 76 are connected via the terminals C, D, at which the winding voltage drops, to a further rectifier circuit GR. A second separate supply voltage VOUT2 is provided, with the current signal AUX2, on the output side on the rectifier circuit GR. The current signal AUX2 is fed into the terminal 7 as auxiliary power supply. The current signal serves the purpose of auxiliary power supply on the secondary side. Provision is made here, in particular, for equipment functions such as, for example, the power supply for stand-by operation.

Figure 3:
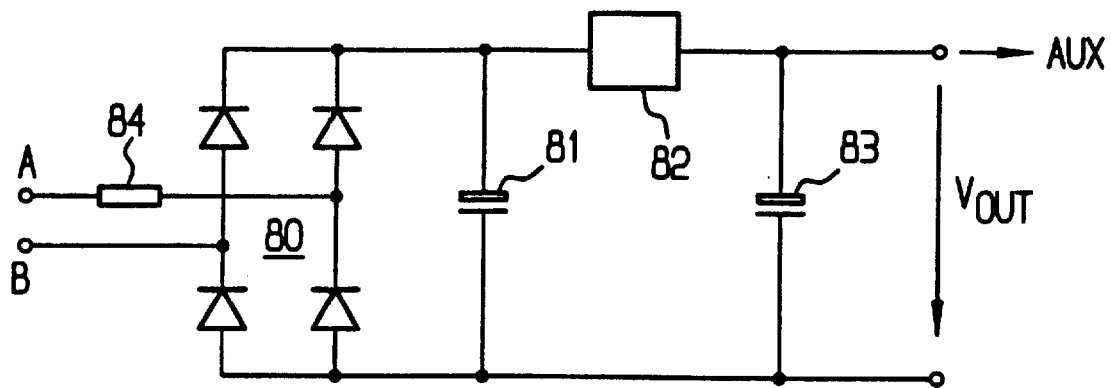
FIGS. 3a and 3b are circuit diagrams for a rectifier circuit for providing a separate supply voltage, which is configured as a bridge rectifier (FIG. 3a) or as a charging pump (FIG. 3b).
Figure 3:
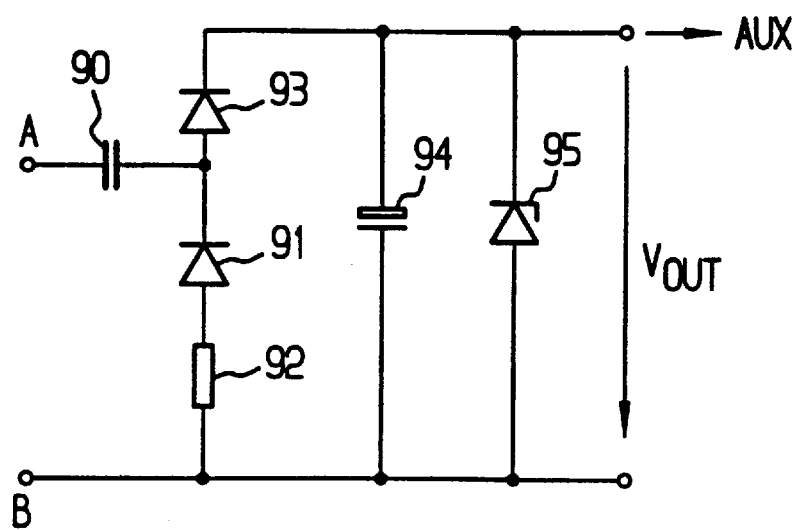

FIG. 3 shows two circuit diagrams for the rectifier circuit GR for providing a separate supply voltage VOUT.

In FIG. 3*a*, the rectifier circuit GR is configured with a bridge rectifier 80 of known type, whose inputs are connected to the terminals A, B. Two capacitors 81, 83 are connected in parallel between the positive and negative outputs of the bridge circuit. The capacitors 81, 83 serve as buffer storage elements and are advantageously configured as electrolytic capacitors. Because of their high efficiency, electrolytic capacitors are advantageous since they can absorb high load currents. Moreover, an in-phase regulator 82, which is configured as an analogue voltage regulator, is connected between the capacitors 81, 83. The separate supply voltage VOUT is present at the output terminals, as is the output current AUX. A resistor 84 can be connected upstream of the bridge rectifier 80 as a current limiting element in order to limit the load current.

The rectifier circuit GR is configured as a charging pump in FIG. 3*b*. The charging pump contains a discharging circuit and a charging circuit. The discharging circuit contains a first capacitor 90, a current limiting element 92 and a first diode 91 in series. The current-limiting element 92 is typically a resistor. At the start of a pulse period, the first capacitor 90 is discharged or charged with negative polarity. The charging current is thereby limited via the current-limiting element 92. The charging circuit contains the first capacitor 90, a second diode 93 and a second capacitor 94 in series, as well as a voltage-limiting element 95 connected in parallel with the second capacitor 94. The voltage-limiting element 95 is typically a Zener diode, the second capacitor 94 is usually configured as an electrolytic capacitor. In the case of a rise in voltage after the circuit-breaker is turned off, the first capacitor 90 is charged with positive polarity via the second diode 93 for the purpose of interrupting the current path. The charging circuit is managed via the second capacitor 94 as a storage element for the separate supply voltage. The current limiting element can also be connected in series with the first capacitor 90. However, this variant has higher loses. The rectifier circuits GR shown in FIG. 2 for providing a primary-side and secondary-side supply voltage VOUT1, VOUT2 can be identical, but need not necessarily be so.

Further separate supply voltages for additional equipment functions can be provided via further windings on the inductor 26 and further rectifier circuits GR.

In addition, a third closed-loop control for the absorbed current can be superimposed on the above-mentioned first and second closed-loop voltage control circuits in a known way. This current regulator expediently has a modified integral action, resulting in suppression of the high-frequency ripple current or averaging even in the case of a non-continuous inductor current. Here, a multiplier is inserted in the controller structure between the first slow closed-loop control circuit and the current controller, and this impresses the wave shape of the input voltage onto the desired value for the current. In this way, an optimum wave shape is produced for the absorbed line current, including the part-load range, and is maintained even if the peak value of the input voltage reaches the output voltage. Moreover, it is easier to achieve interference suppression when operating with a lower-order current control.

I claim:

1. A pulsed power supply of a switched-mode power supply, including a switched-mode power supply with a stand-by operation, comprising:

a) a main converter for electrically isolating primary and secondary circuits and for transforming voltages of said primary and secondary circuits;

b) a pulsed converter having a first output circuit and an output voltage, said pulsed converter connected upstream of said main converter;

c) a first closed-loop control circuit for an intermediate circuit voltage equal to said output voltage of said pulsed converter and having a first control time constant, said first closed-loop control circuit associated with said pulsed converter; and d) a second closed-loop control circuit associated with said pulsed converter and having a second output circuit for said intermediate circuit voltage and a second control time constant, said second closed-loop control circuit being superimposed on said first closed-loop control circuit such that it can be activated at least temporarily for replacing said first closed-loop control circuit at least temporarily, said first control time constant of said first closed-loop control circuit greater than said second control time constant of said second closed-loop control circuit.

2. The pulsed power supply according to claim 1, wherein said pulsed converter is an active harmonic filter.

3. The pulsed power supply according to claim 1, wherein said pulsed converter is a step-up converter.

4. The pulsed power supply according to claim 1, wherein said second output circuit includes a linear element and a storage element disposed in parallel with said first output circuit of said pulsed converter, said second output circuit having a delay time shorter than a delay time of said first output circuit.

5. The pulsed power supply according to claim 1, including rectifier circuits, and said pulsed converter has an inductor with at least one further winding for tapping a winding voltage to provide separate supply voltages via each of said rectifier circuits.

6. The pulsed power supply according to claim 5, wherein said rectifier circuits contain a bridge rectifier.

7. The pulsed power supply according to claim 6, wherein said bridge rectifiers contain a charging pump.

8. The pulsed power supply according to claim 5, wherein at least one of said separate supply voltages is to be provided on a primary side of a system control of an integrated circuit.

9. The pulsed power supply according to claim 8, wherein at least one further one of said separate supply voltages is to be provided on a secondary side for a power supply of equipment functions including a stand-by operation.

* * * * *